United States Patent
Yoon et al.

(10) Patent No.: US 12,068,113 B2
(45) Date of Patent: *Aug. 20, 2024

(54) DIELECTRIC CERAMIC COMPOSITION AND MULTILAYER CERAMIC ELECTRONIC COMPONENT USING THE SAME

(71) Applicant: SAMSUNG ELECTRO-MECHANICS CO., LTD., Suwon-si (KR)

(72) Inventors: Seok Hyun Yoon, Suwon-si (KR); Chan Hee Nam, Suwon-si (KR); Song Je Jeon, Suwon-si (KR); Chang Hak Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,856

(22) Filed: Jun. 27, 2023

(65) Prior Publication Data

US 2023/0343517 A1     Oct. 26, 2023

Related U.S. Application Data

(63) Continuation of application No. 17/692,529, filed on Mar. 11, 2022, now Pat. No. 11,728,094, which is a
(Continued)

(30) Foreign Application Priority Data

Jun. 28, 2019   (KR) .................. 10-2019-0078009
Aug. 5, 2019    (KR) .................. 10-2019-0094914

(51) Int. Cl.
*H01G 4/12*    (2006.01)
*H01G 4/30*    (2006.01)

(52) U.S. Cl.
CPC ............. *H01G 4/1227* (2013.01); *H01G 4/30* (2013.01)

(58) Field of Classification Search
CPC ....... H01G 4/1209; H01G 4/1227; H01G 4/30
See application file for complete search history.

(56) References Cited

U.S. PATENT DOCUMENTS 8,059,388 B2   11/2011   Yamazaki et al.
8,208,240 B2    6/2012   Yamazaki et al.
(Continued)

FOREIGN PATENT DOCUMENTS

CN   101765894 A    6/2010
JP   2002-255639 A  9/2002
(Continued)

OTHER PUBLICATIONS

Seok-Hyun Yoon et al., "Effect of the pyrochlore (Y2TisO7) phase on the resistance degradation in yttrium-doped BaTiO3 ceramic capacitors," J. Mater. Res., vol. 22, No. 9, Sep. 2007, 2539-2543.
(Continued)

*Primary Examiner* — Nathan Milakovich
(74) *Attorney, Agent, or Firm* — IMORGAN. LEWIS & BOCKIUS LLP

(57) ABSTRACT

A dielectric ceramic composition includes a base material main component of barium titanate and a subcomponent. A microstructure of the dielectric ceramic composition after sintering includes a first grain having a Ca content of less than 3.5 at % and a second grain having a Ca content of 3.5 to 13.5 at %, and an area ratio of the second grain to an area of the total grains is 70% to 95%.

16 Claims, 2 Drawing Sheets

Related U.S. Application Data continuation of application No. 16/777,182, filed on Jan. 30, 2020, now Pat. No. 11,309,129.

(56) References Cited

U.S. PATENT DOCUMENTS

| | | |
|---|---|---|
| 9,583,266 B2 | 2/2017 | Yoon et al. |
| 9,984,825 B2 | 5/2018 | Park et al. |
| 9,988,310 B2 | 6/2018 | Yoon et al. |
| 11,309,129 B2 * | 4/2022 | Yoon .................... H01G 4/1227 |
| 2010/0067171 A1 | 3/2010 | Yamazaki et al. |
| 2010/0188797 A1 | 7/2010 | Yamazaki et al. |
| 2016/0172107 A1 | 6/2016 | Yoon et al. |
| 2017/0186543 A1 | 6/2017 | Park et al. |
| 2020/0381179 A1 | 12/2020 | Yoon et al. |

FOREIGN PATENT DOCUMENTS

| | | |
|---|---|---|
| JP | 2003-192432 A | 7/2003 |
| JP | 2005-22890 A | 1/2005 |
| JP | 2005-263508 A | 9/2005 |
| JP | 2005-272262 A | 10/2005 |
| JP | 2006-62937 A | 3/2006 |
| KR | 10-2009-0060454 A | 6/2009 |
| KR | 10-2017-0076310 A | 7/2017 |
| KR | 10-2018-0038429 A | 4/2018 |
| WO | 2008/066140 A1 | 6/2008 |

OTHER PUBLICATIONS

Seok-Hyun Yoon et al., "Resistance degradation behavior of Ca-doped BaTiO3," J. Mater. Res., vol. 25, No. 11, Nov. 2010, 2135-2142.

Seok-Hyun Yoon et al., "Effect of Ca incorporation on the dielectric nonlinear behavior of (Ba, Ca)TiO3 multi layer ceramic capacitors," Applied Physics Letters 2014 105, 242902-1-242902-5.

Office Action issued in corresponding U.S. Appl. No. 16/777,182 dated Apr. 9, 2021.

Final Office Action issued in corresponding U.S. Appl. No. 16/777,182 dated Oct. 15, 2021.

Notice of Allowance issued in corresponding U.S. Appl. No. 16/777,182 dated Jan. 5, 2022.

Office Action (with English translation) dated May 24, 2022, issued in corresponding Chinese Patent Application No. 202010325069.7.

Office Action issued in corresponding U.S. Appl. No. 17/692,529 dated Dec. 21, 2022.

Notice of Allowance issued in corresponding U.S. Appl. No. 17/692,529 dated Mar. 29, 2023.

* cited by examiner

I-I'

DIELECTRIC CERAMIC COMPOSITION AND MULTILAYER CERAMIC ELECTRONIC COMPONENT USING THE SAME

CROSS-REFERENCE TO RELATED APPLICATION(S)

This application is the continuation application of U.S. patent application Ser. No. 17/692,529 filed on Mar. 11, 2022, which is the continuation of U.S. patent application Ser. No. 16/777,182 filed on Jan. 30, 2020, now U.S. Pat. No. 11,309,129 issued on Apr. 19, 2022, which claims benefit of priorities to Korean Patent Application No. 10-2019-0078009 filed on Jun. 28, 2019 and Korean Patent Application No. 10-2019-0094914 filed on Aug. 5, 2019 in the Korean Intellectual Property Office, the disclosures of which are incorporated herein by reference in their entirety.

TECHNICAL FIELD

The present disclosure relates to a dielectric ceramic composition and a multilayer ceramic electronic component having the same.

BACKGROUND

Electronic components using a ceramic material, such as capacitors, inductors, piezoelectric elements, varistors, or thermistors, include a ceramic body formed of a ceramic material, an internal electrode formed inside a body, and an external electrode provided on the surface of the ceramic body to be connected to the internal electrode.

Among ceramic electronic components, a multilayer ceramic capacitor includes a plurality of stacked dielectric layers, internal electrodes disposed to face each other with one dielectric layer interposed therebetween, and external electrodes electrically connected to the internal electrodes.

A multilayer ceramic capacitor is usually manufactured by laminating and simultaneously firing an internal electrode paste and a dielectric layer paste by a sheet method, a printing method, or the like.

A dielectric material used in the related art multilayer ceramic high capacity capacitor and the like is a ferroelectric material based on barium titanate ($BaTiO_3$), and has a high dielectric constant at room temperature, a relatively low dissipation factor, and excellent insulation resistance.

Recently, due to the development of the electrical and electronics industry, demand for ceramic electronic components having excellent capacity temperature characteristics and reliability at withstand voltage and high temperature has been rapidly increasing. Accordingly, in addition to general high-capacity ceramic electronic components that are guaranteed up to 85° C. in EIA standards, X7R guaranteed up to 125° C., X8R guaranteed up to 150° C. and X9M ceramic electronic components guaranteed up to 200° C. are required.

However, barium titanate ($BaTiO_3$) has a Curie temperature of only 125° C., and thus, there is a limit in that a dielectric constant is sharply lowered at above the temperature. Thus, there has been proposed a method of suppressing a decrease in dielectric constant at Curie temperature or more by composition to which an excess amount of rare earth is added, but in this case, generation of a pyrochlore secondary phase or the like may be problematic.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a dielectric ceramic composition and a multilayer ceramic electronic component, having excellent high temperature withstand voltage characteristics.

An aspect of the present disclosure is to provide a dielectric ceramic composition and a multilayer ceramic electronic component, in which a decrease in a dielectric constant may be suppressed.

An aspect of the present disclosure is to provide a dielectric ceramic composition and a multilayer ceramic electronic component, which may have a high RC value.

An aspect of the present disclosure is to provide a dielectric ceramic composition and a multilayer ceramic electronic component capable of satisfying X7R, X8R and X9M.

According to an aspect of the present disclosure, a dielectric ceramic composition includes a base material main component of barium titanate and a subcomponent. A microstructure of the dielectric ceramic composition after sintering includes a first grain having a Ca content of less than 3.5 at % and a second grain having a Ca content of 3.5 to 13.5 at %, and an area ratio of the second grain to an area of the total grains is 70% to 95%.

According to an aspect of the present disclosure, a multilayer ceramic electronic component includes a ceramic body including a dielectric layer and an internal electrode; and an external electrode disposed on an external surface of the ceramic body and electrically connected to the internal electrode. A microstructure of the dielectric layer includes a first grain having a Ca content of less than 3.5 at % and a second grain having a Ca content of 3.5 to 13.5 at %, and an area ratio of the second grain to an area of total grains is 70% to 95%.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Figure 1:
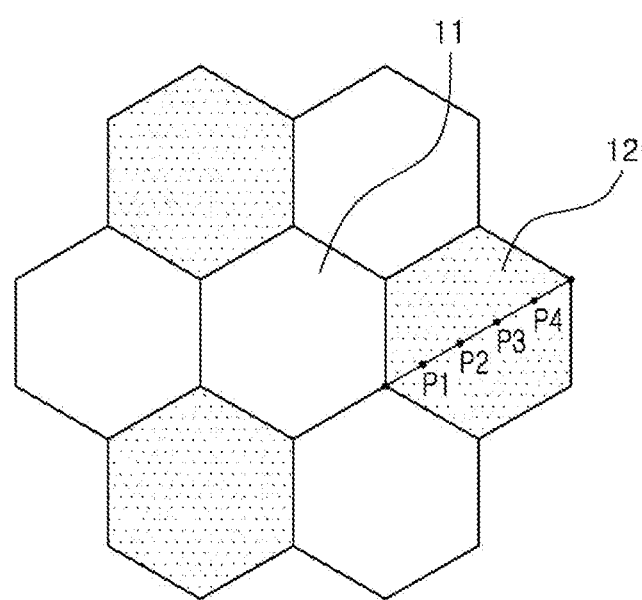
FIG. 1 is a schematic diagram illustrating a microstructure of a dielectric ceramic composition after sintering according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various manners, as will be apparent after gaining an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Subsequently, examples are described in further detail with reference to the accompanying drawings.

A dielectric ceramic composition according to an embodiment is provided, and an electronic component including the dielectric ceramic composition may be provided as a capacitor, an inductor, a piezoelectric element, a varistor, a thermistor, or the like.

FIG. 1 is a schematic diagram illustrating a microstructure of a dielectric ceramic composition after sintering according to an embodiment. A dielectric material formed by sintering a dielectric ceramic composition according to an embodiment includes a plurality of dielectric grains, as illustrated in FIG. 1.

Referring to FIG. 1, a dielectric ceramic composition according to an embodiment includes a barium titanate base material main component and a subcomponent. In a microstructure of the dielectric ceramic composition after sintering, grains having a calcium (Ca) content of less than 3.5 at % may be defined as a first grain 11 and grains having a Ca content of 3.5 to 13.5 at % are defined as a second grain 12. In this case, an area ratio of the second grain may be in a range of 70% to 95% based on 100% of a total area of the dielectric material after sintering.

The Ca content in the grains may be measured by scanning transmission electron microscopy-energy-dispersive x-ray spectroscopy (STEM-EDS) analysis. In a sintered body of the dielectric composition according to an embodiment, the content of Ca in one grain may be determined as an average value of values measured at P1, P2, P3 and P4 positions of each grain. P1, P2, P3 and P4 may be defined as $\frac{1}{5}$, $\frac{2}{5}$, $\frac{3}{5}$ and $\frac{4}{5}$ points of a straight line crossing each grain.

In the present specification, the "main component" may refer to a component that occupies a relatively large weight ratio compared to other components, and may refer to a component that is 50% by weight or more based on the weight of the entire composition or the entire dielectric layer. In addition, the "subcomponent" may refer to a component that occupies a relatively small weight ratio compared to other components, and may refer to a component that is less than 50% by weight based on the weight of the entire composition or the entire dielectric layer.

A temperature coefficient of capacitance (TCC) may be improved by using barium calcium titanate (BCT) in which Ca is included in barium titanate, as base material powder to improve high temperature characteristics, but a change in a dielectric constant by an AC electric field is high, and side effects such as lowering a room temperature RC value and increasing DF may occur.

However, in a dielectric ceramic composition according to an embodiment of the present disclosure, high temperature characteristics (X8R and/or X9M characteristics) and good reliability may be obtained while reducing occurrence of side effects, by mixing a first base material component and a second base material component, having different Ca contents, at an appropriate ratio, and by adjusting a subcomponent additive composition.

In addition, in a case in which $CaZrO_3$ and an excess of rare earth element is added to $BaTiO_3$ to satisfy high temperature characteristics (X8R and/or X9M characteristics), since the Curie temperature of the base material itself is 125° C. even in a case in which the high temperature characteristics are implemented, there is a limit in improving the temperature coefficient of capacitance (TCC). Further, there is a problem of deterioration in reliability due to pyrochlore secondary phase generation due to the addition of an excess of rare earth element.

However, according to an embodiment of the present disclosure, the contents of the first base material main component and the second base material main component are controlled to satisfy the high temperature characteristics (X8R and/or X9M characteristics) and to improve temperature coefficient of capacitance (TCC) characteristics.

Therefore, in the case of a multilayer ceramic capacitor to which the dielectric ceramic composition according to an embodiment is applied, high temperature characteristics (X8R and/or X9M characteristics) may be satisfied and good temperature coefficient of capacitance (TCC) characteristics may be implemented.

In addition, by adjusting the ratio of (Ba+Ca)/Si of the sub-component that may implement proper dielectric constant and sinterability, the dielectric constant and sinterability may be implemented and high temperature characteristics (X8R and/or X9M characteristics) may be satisfied.

A dielectric ceramic composition according to an embodiment may include a base material main component and a subcomponent, and the subcomponent may include first to fifth subcomponents.

The dielectric ceramic composition may include a barium titanate-based base material; and at least one selected from: a first subcomponent including at least one selected from the group consisting of variable-valence acceptor elements including at least one of Mn, V, Cr, Fe, Ni, Co, Cu or Zn, oxides thereof, or carbonates thereof; a second subcomponent including at least one of fixed-valence acceptor elements comprising Mg, oxides thereof, or carbonates thereof; a third subcomponent including at least one selected from the group consisting of one or more elements among yttrium (Y), dysprosium (Dy), holmium (Ho), erbium (Er), gadolinium (Gd), cerium (Ce), neodymium (Nd), samarium (Sm), terbium (Tb), thulium (Tm), lanthanum (La) and ytterbium (Yb), oxides thereof, or carbonates thereof; a fourth subcomponent including at least one selected from the group consisting of one or more of Ba and Ca, oxides thereof, or carbonates thereof; and a fifth subcomponent including at least one selected from the group consisting of an oxide of Si element, a carbonate of Si element, and a glass containing Si element.

Hereinafter, respective components of the dielectric ceramic composition according to an embodiment will be described in more detail.

Base Material Main Component

A dielectric ceramic composition according to an embodiment may include a barium titanate base material main component.

According to an embodiment, the base material main component includes a first base material main component represented by $(Ba_{1-x}Ca_x)TiO_3$ (x≤0.035) and a second base material main component represented by $(Ba_{1-y}Ca_y)TiO_3$ (0.035≤y≤0.135), where x is 0 or more, and when x is 0, the first base material main component is $BaTiO_3$.

The base material main component may be included in the form of powder, and the first base material main component may be included as a first base material powder and the second base material main component may be included as a second base material powder, in the dielectric ceramic composition.

According to an embodiment, when a molar ratio of the first base material main component is defined as 1-z and a molar ratio of the second base material main component is defined as z, z satisfies 0.70≤z≤0.95. For example, when a mixed powder of the first base material powder and the second base material powder is expressed as $(1-z)(Ba_{1-x}Ca_x)TiO_3+z(Ba_{1-y}Ca_y)TiO_3$, z satisfies 0.70≤z≤0.95. According to an embodiment, z satisfies the range 0.70≤z≤0.95, thereby obtaining the above-described microstructure of the dielectric composition after sintering. In this case, a good high temperature part TCC, relatively low DF, and a high RC value may be implemented.

An average particle diameter of the base material main component powder is not particularly limited, but may be 1000 nm or less.

If excess $CaZrO_3$ and rare earth elements are added to the $BaTiO_3$ base material, the X8R and/or X9M temperature characteristics may be implemented, but the Curie temperature of the base material itself is about 125° C., so there is a limit in improving the high temperature part TCC. In this case, further, the problem of deterioration of reliability due to generation of a secondary phase may occur.

However, according to an embodiment of the present disclosure, when a submicron additive is applied to a mixed base material of the first base material main component and the second base material main component to implement a mixed microstructure composed of a first grain and a second grain, good high temperature part TCC characteristics may be implemented as compared with the case of adding $CaZrO_3$ or an excessive rare earth element to a $BaTiO_3$ base material.

In addition, according to an embodiment, when the subcomponent additive is applied to the mixed base material of the first base material main component and the second base material main component to implement a mixed microstructure composed of the first grain and the second grain, relatively low DF and high insulation resistance may be obtained as compared to the case of application of BCT base material alone.

b) First Subcomponent

According to an embodiment, the dielectric ceramic composition may include, as a first subcomponent, at least one selected from the group consisting of a variable-valence acceptor element including at least one of manganese (Mn), vanadium (V), chromium (Cr), iron (Fe), nickel (Ni), cobalt (Co), copper (Cu) and zinc (Zn), oxides thereof, or carbonates thereof.

The first subcomponent may be included in a range of 0.1 to 2.0 mol % based on the base material main component. In this specification, "x mol %" of a component based on the base material main component may mean that the x mole part is included with respect to 100 mole parts of the base material main component.

The content of the first subcomponent may be based on the content of at least one element among Mn, V, Cr, Fe, Ni, Co, Cu and Zn included in the first subcomponent without distinguishing an addition form such as an oxide or a carbonate. For example, the sum of the contents of a variable-valence acceptor element of at least one or more of Mn, V, Cr, Fe, Ni, Co, Cu and Zn included in the first subcomponent is 0.1 to 2.0 mole parts with respect to 100 mole parts of the base material main component.

The first subcomponent serves to improve reduction resistance of the dielectric ceramic composition and improve high temperature withstand voltage characteristics of a multilayer ceramic electronic component to which the dielectric ceramic composition is applied.

When the content of the first subcomponent is 0.1 to 2.0 mole parts with respect to 100 mole parts of the base material main component, a dielectric ceramic composition in which an RC value is secured and high temperature withstand voltage characteristics are improved may be provided. If the content of the first subcomponent is less than 0.1 mole part, the RC value may be relatively very low or the high temperature withstand voltage may be low. If the content of the first subcomponent exceeds 2.0 mole parts, a phenomenon in which the RC value decreases may occur.

The dielectric ceramic composition according to an embodiment of the present disclosure may include a first subcomponent having a content of 0.1 to 2.0 mole parts with respect to 100 mole parts of the base material powder, thereby enabling low temperature firing and obtaining high temperature withstand voltage characteristics.

c) Second Subcomponent

According to an embodiment, the dielectric ceramic composition may include, as a second subcomponent, at least one of fixed-valence acceptor elements including magnesium (Mg), oxides thereof, or carbonates thereof.

The second subcomponent may be included in a range of 0.5 to 3.0 mol % with respect to the base material main component. The content of the second subcomponent may be based on the content of the Mg element included in the second subcomponent without distinguishing an addition form such as an oxide or a carbonate. For example, the content of the Mg element included in the second subcomponent may be 3.0 mole parts or less with respect to 100 mole parts of the base material main component.

If the content of the second subcomponent exceeds 3.0 mole parts with respect to 100 mole parts of the dielectric base material main component, a dielectric constant may be lowered and high temperature withstand voltage characteristics may be lowered.

d) Third Subcomponent

According to an embodiment, the dielectric ceramic composition includes a third subcomponent including at least one selected from the group consisting of at least one or more elements among Y, Dy, Ho, Er, Gd, Ce, Nd, Sm, Tb, Tm, La and Yb, oxides thereof, or carbonates thereof.

The third subcomponent may be included in the range of 2.0 to 7.0 mol % based on the base material main component. The content of the third subcomponent may be based on the content of at least one or more elements among Y, Dy, Ho, Er, Gd, Ce, Nd, Sm, Tb, Tm, La and Yb contained in the third subcomponent without discriminating the addition form such as an oxide or a carbonate. For example, the sum of the contents of at least one or more elements among Y, Dy, Ho, Er, Gd, Ce, Nd, Sm, Tb, Tm, La and Yb contained in the third subcomponent may be 2.0 to 7.0 mole parts with respect to 100 mole parts of the base material main component.

The third subcomponent prevents deterioration of reliability of a multilayer ceramic electronic component to which the dielectric ceramic composition is applied in an embodiment. If the third subcomponent is outside of the above-described range, high temperature withstand voltage characteristics may be degraded.

e) Fourth Subcomponent

According to an embodiment, the dielectric ceramic composition may include a fourth subcomponent including at least one selected from the group consisting of at least one or more of Ba and Ca, oxides thereof, or carbonates thereof.

The fourth subcomponent may be included in the range of 0.5 to 3.0 mol % with respect to the base material main component. The content of the fourth subcomponent may be based on the content of at least one or more of Ba and Ca included in the fourth subcomponent without distinguishing an addition form such as an oxide or a carbonate. For example, the sum of the contents of at least one or more of Ba and Ca included in the fourth subcomponent may be 0.5 to 3.0 mole parts based on 100 mole parts of the base material main component.

The fourth subcomponent may be included in a range of 0.5 to 3.0 mole parts with respect to 100 mole parts of the base material main component to adjust the crystal structure of the dielectric ceramic composition according to an embodiment and to improve high temperature withstand voltage characteristics.

f) Fifth Subcomponent

According to an embodiment, the dielectric ceramic composition may include a fifth subcomponent including at least one selected from the group consisting of an oxide of Si element, a carbonate of Si element and a glass containing an Si element.

The fifth subcomponent may be included in the range of 0.5 to 4.0 mol % based on the base material main component. The content of the fifth subcomponent may be based on the content of Si element included in the fifth subcomponent without distinguishing an addition form such as glass, an oxide or a carbonate.

If the content of the fifth subcomponent is less than 0.5 mole part with respect to 100 mole parts of the dielectric base material main component, a dielectric constant and high temperature withstand voltage characteristics may decrease. If the content of the fifth subcomponent is more than 4.0 mole parts with respect to 100 mole parts of the dielectric base material main component, there may be problems such as lowering of sinterability, lowering of density, secondary phase generation, or the like.

According to an embodiment, a multilayer ceramic electronic component is provided.

Figure 2:
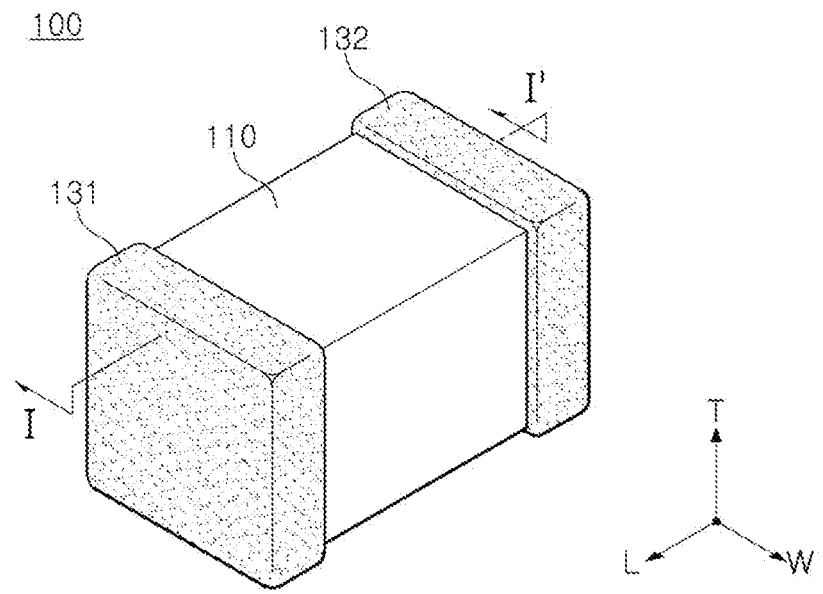
FIG. 2 is a schematic perspective view illustrating a multilayer ceramic capacitor according to an embodiment.
Figure 3:
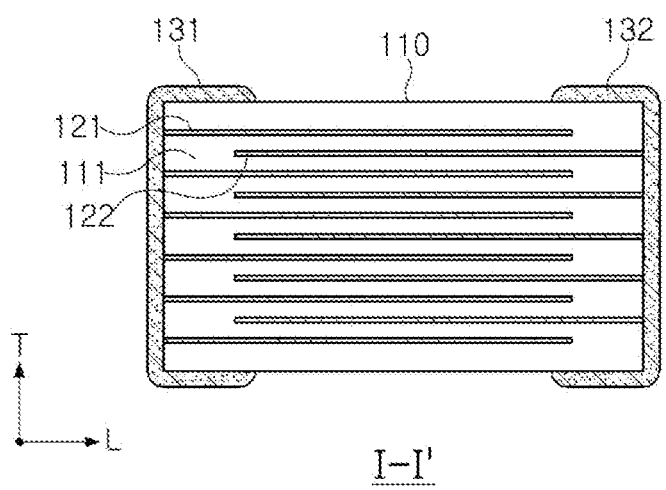
FIG. 3 is a cross-sectional view taken along line I-I' of FIG. 1.

FIG. 2 is a schematic perspective view of a multilayer ceramic electronic component according to another embodiment, and FIG. 3 is a schematic cross-sectional view of a multilayer ceramic electronic component taken along line I-I' of FIG. 2.

Referring to FIGS. 2 and 3, a multilayer ceramic electronic component 100 according to another embodiment includes a ceramic body 110 in which dielectric layers 111 and internal electrodes 121 and 122 are alternately stacked. On both ends of the ceramic body 110, first and second external electrodes 131 and 132 are disposed to be conductively connected to the first and second internal electrodes 121 and 122 alternately disposed inside the ceramic body 110, respectively.

The shape of the ceramic body 110 is not particularly limited, but may be substantially hexahedral. Further, the dimensions of the ceramic body 110 are not particularly limited, and may be set as appropriate dimensions according to intended use. For example, the ceramic body 110 may have dimensions of (0.6 to 5.6 mm)×(0.3 to 5.0 mm)×(0.3 to 1.9 mm).

The thickness of the dielectric layer 111 may be arbitrarily changed depending on the capacity design of the electronic component. In an embodiment, a thickness of the dielectric layer 111 after firing may be 1 μm or less per layer. The thickness of the dielectric layer 111 may be 1 μm or less, 0.9 μm or less, 0.8 μm or less, 0.7 μm, 0.6 μm or less, 0.5 μm or less, or 0.4 μm or less, but is not limited thereto. Since a relatively too thin dielectric layer has a small number of grains present in one layer, which adversely affects reliability, the thickness of the dielectric layer may be 0.1 μm or more.

The first and second internal electrodes 121 and 122 may be stacked in such a manner that respective end surfaces are exposed to opposite ends of the ceramic body 110, respectively. The first and second external electrodes 131 and 132 are formed on both ends of the ceramic body 110 and are electrically connected to the exposed end surfaces of the first and second internal electrodes 121 and 122 to form an electronic circuit.

A conductive material contained in the first and second internal electrodes 121 and 122 is not particularly limited, but in detail, nickel (Ni) may be used.

The thicknesses of the first and second internal electrodes 121 and 122 may be appropriately determined according to the use, and for example, may be 5 μm or less, 4 μm or less, 3 μm or less, 2 μm, 1 μm or less, 0.6 μm or less, or 0.4 μm or less, is not limited thereto. Excessively thin internal electrodes are susceptible to short circuits, and thus, the thickness of the internal electrodes may be 0.1 μm or more.

A conductive material contained in the first and second external electrodes 131 and 132 is not particularly limited, but nickel (Ni), copper (Cu) or an alloy thereof may be used.

The dielectric layer 111 constituting the ceramic body 110 may include a dielectric ceramic composition according to an embodiment. The dielectric layer 111 constituting the ceramic body 110 may be formed by sintering the dielectric ceramic composition according to an embodiment.

The dielectric ceramic composition includes a barium titanate base material main component and a subcomponent, and a microstructure of the dielectric ceramic composition after sintering includes a first grain having a Ca content of less than 3.5 at % and a second grain having a Ca content of 3.5 to 13.5 at %. In this case, an area ratio of the second grain to the area of the overall grain may be in the range of 70% to 95%.

In an embodiment, the base material main component included in the dielectric ceramic composition includes a first base material main component represented by $(Ba_{1-x}Ca_x)TiO_3$ (x≤0.035), a second base material main component represented by $(Ba_{1-y}Ca_y)TiO_3$ (0.035≤y≤0.135). When the molar ratio of the first base material main component is defined as 1-z and the molar ratio of the second base material main component is defined as z, 0.7≤z≤0.95 is satisfied.

In another example, the dielectric layer of the multilayer ceramic electronic component according to an embodiment may include a barium titanate base material main component; and at least one selected from: a first subcomponent including at least one selected from the group consisting of variable-valence acceptor elements including at least one of Mn, V, Cr, Fe, Ni, Co, Cu or Zn, oxides thereof, or carbonates thereof; a second subcomponent including at least one of fixed-valence acceptor elements comprising Mg, oxides thereof, or carbonates thereof; a third subcomponent including at least one selected from the group consisting of one or more elements among yttrium (Y), dysprosium (Dy), holmium (Ho), erbium (Er), gadolinium (Gd), cerium (Ce), neodymium (Nd), samarium (Sm), terbium (Tb), thulium (Tm), lanthanum (La) and ytterbium (Yb), oxides thereof, or carbonates thereof; a fourth subcomponent including at least one selected from the group consisting of one or more of Ba and Ca, oxides thereof, or carbonates thereof; and a fifth subcomponent including at least one selected from the group consisting of an oxide of Si element, a carbonate of Si element, and a glass containing Si element.

The detailed description of the dielectric ceramic composition is the same as the features of the dielectric ceramic composition according to the embodiment described above and will thus be omitted. In addition, in this specification, the multilayer ceramic electronic component is illustrated as a multilayer ceramic capacitor, but is not limited thereto.

Hereinafter, embodiments will be described in more detail with reference to the experimental example. However, the scope of the present disclosure is not limited by the experimental examples.

Experimental Example (1-z) $(Ba_{1-x}Ca_x)TiO_3+z(Ba_{1-y}Ca_y)TiO_3$ mixed solid solution powder, which is a base material powder containing a first base material main component and a second base material main component, was prepared by using a solid phase method as follows.

Starting materials are $BaCO_3$, $TiO_2$ and $CaCO_3$. These starting material powders were mixed by a ball mill and calcined at 900 to 1000° C. to obtain $(Ba_{1-x}Ca_x)TiO_3$ first main component powder and $(Ba_{1-y}Ca_y)TiO_3$ second main component powder (x<y), having an average particle size of 300 nm.

After adding a subcomponent additive powder to the main component base powder in accordance with the composition ratio specified in Table 1, Table 3, Table 5 and Table 7, the raw material powder containing the main component and subcomponents, ethanol/toluene, a dispersant and a binder were mixed by using zirconia balls as mixing/dispersing media, and then followed by ball milling for 20 hours.

The prepared slurry was manufactured to form a molded sheet having a thickness of 10 μm using a doctor blade coater. Ni internal electrode printing was performed on the manufactured molded sheet. Upper and lower covers were manufactured by stacking 25 sheets of cover sheets, and a bar was manufactured by pressing and stacking 21 layers of printed active sheets. The pressed bar was cut into 3.2 mm×1.6 mm chips using a cutter.

The fabricated 3216-sized chips were calcined and then fired at a temperature of 1200 to 1250° C. for 2 hours in a reducing atmosphere of 1.0% $H_2$/99.0% $N_2$ ($H_2O/H_2/N_2$ atmosphere), and then subjected to heat treatment by performing reoxidation for 3 hours at 1000° C. in an $N_2$ atmosphere. The external electrode was completed through a termination process and electrode firing with Cu paste on the fired chip.

The prototype multilayer ceramic capacitor (prototype MLCC) specimens completed as described above were evaluated for capacitance, DF, insulation resistance, TCC, and resistance degradation behavior with increasing voltage step at a high temperature of 200° C.

The room temperature capacitance and dielectric loss of the multilayer ceramic capacitor (MLCC) chip were measured under the conditions of 1 kHz and AC 0.2V/μm using an LCR meter. The capacitance of the multilayer ceramic capacitor (MLCC) chip, a dielectric thickness of the MLCC chip, an internal electrode area, and a dielectric constant of the MLCC chip dielectric from the number of layers were calculated.

The room temperature insulation resistance (IR) was measured after 60 seconds in a state in which 10 samples were taken and DC 10V/μm was applied. The change in capacitance with temperature was measured in the temperature range of −55° C. to 200° C. In the high temperature IR boost test, the resistance degradation behavior was measured by increasing the voltage step by 5V/μm at 200° C. The time for each step was 60 minutes and resistance values were measured at 10 second intervals.

The high temperature withstand voltage was derived from the high temperature IR boost test. The high temperature withstand voltage refers to a voltage at which IR can withstand 10$^5$Ω or more, when applying a voltage step dc 5V/μm for 60 minutes at 200° C. in a 3216 size chip having a 20-layer dielectric and a thickness of 7 μm after firing and when measuring while continuously increasing this voltage step.

FIG. 1 is a schematic drawing illustrating a microstructure comprised of a first grain (a first main component) and a second grain (a second main component) and positions P1, P2, P3 and P4 to analyze the content of Ca by STEM/EDS analysis within each grain.

The content of Ca in the 20 grains was analyzed by STEM/EDS analysis to calculate the first grain area ratio (%) 100-a and the second grain area ratio (%) a. The Ca content in one grain was set as an average value of four data of Ca contents at P1 to P4 points as illustrated in FIG. 1.

Table 1, Table 3, Table 5 and Table 7 below are the composition tables of the experimental examples, and Table 2, Table 4, Table 6 and Table 8 illustrate characteristics of the prototype MLCC chip corresponding to the compositions specified in Table 1, Table 3, Table 5 and Table 7.

TABLE 1

| Sample | First main component powder $(Ba_{1-x}Ca_x)TiO_3$ | | Second main component powder $(Ba_{1-y}Ca_y)TiO_3$ | | 1st powder:2nd powder mixing mol ratio $(1-z)[(Ba_{1-x}Ca_x)TiO_3] + z[(Ba_{1-y}Ca_y)TiO_3]$ | | Number of each additive mole per 100 mole of base material main component | | | | | | | |
|---|---|---|---|---|---|---|---|---|---|---|---|---|---|---|
| | Ba Content | Ca Content | Ba Content | Ca Content | First base material main component | Second base material main component | First sub-component | Second sub-component | Third sub-component | | Fourth sub-component | | Fifth sub-component |
| | 1 − x | x | 1 − y | y | 1 − z | z | $MnO_2$ | $V_2O_5$ | $MgCO_3$ | $Y_2O_3$ | $Dy_2O_3$ | $BaCO_3$ | $CaCO_3$ | $SiO_2$ |
| 1 | 1 | 0 | 0.97 | 0.03 | 1 | 0 | 0.15 | 0.2 | 2.5 | 2 | 0.75 | 1.5 | 0 | 2 |
| 2 | 1 | 0 | 0.97 | 0.03 | 0 | 1 | 0.15 | 0.2 | 2.5 | 2 | 0.75 | 1.5 | 0 | 2 |
| 3 | 1 | 0 | 0.96 | 0.04 | 0.4 | 0.6 | 0.15 | 0.2 | 2.5 | 2 | 0.75 | 1.5 | 0 | 2 |
| 4 | 1 | 0 | 0.96 | 0.04 | 0.3 | 0.7 | 0.15 | 0.2 | 2.5 | 2 | 0.75 | 1.5 | 0 | 2 |
| 5 | 1 | 0 | 0.96 | 0.04 | 0.2 | 0.8 | 0.15 | 0.2 | 2.5 | 2 | 0.75 | 1.5 | 0 | 2 |
| 6 | 1 | 0 | 0.96 | 0.04 | 0.05 | 0.95 | 0.15 | 0.2 | 2.5 | 2 | 0.75 | 1.5 | 0 | 2 |
| 7 | 1 | 0 | 0.96 | 0.04 | 0 | 1 | 0.15 | 0.2 | 2.5 | 2 | 0.75 | 1.5 | 0 | 2 |
| 8 | 1 | 0 | 0.925 | 0.075 | 0.4 | 0.6 | 0.15 | 0.2 | 2.5 | 2 | 0.75 | 1.5 | 0 | 2 |
| 9 | 1 | 0 | 0.925 | 0.075 | 0.3 | 0.7 | 0.15 | 0.2 | 2.5 | 2 | 0.75 | 1.5 | 0 | 2 |
| 10 | 1 | 0 | 0.925 | 0.075 | 0.2 | 0.8 | 0.15 | 0.2 | 2.5 | 2 | 0.75 | 1.5 | 0 | 2 |
| 11 | 1 | 0 | 0.925 | 0.075 | 0.05 | 0.95 | 0.15 | 0.2 | 2.5 | 2 | 0.75 | 1.5 | 0 | 2 |
| 12 | 1 | 0 | 0.925 | 0.075 | 0 | 1 | 0.15 | 0.2 | 2.5 | 2 | 0.75 | 1.5 | 0 | 2 |
| 13 | 1 | 0 | 0.88 | 0.12 | 0.4 | 0.6 | 0.15 | 0.2 | 2.5 | 2 | 0.75 | 1.5 | 0 | 2 |
| 14 | 1 | 0 | 0.88 | 0.12 | 0.3 | 0.7 | 0.15 | 0.2 | 2.5 | 2 | 0.75 | 1.5 | 0 | 2 |
| 15 | 1 | 0 | 0.88 | 0.12 | 0.2 | 0.8 | 0.15 | 0.2 | 2.5 | 2 | 0.75 | 1.5 | 0 | 2 |
| 16 | 1 | 0 | 0.88 | 0.12 | 0.05 | 0.95 | 0.15 | 0.2 | 2.5 | 2 | 0.75 | 1.5 | 0 | 2 |
| 17 | 1 | 0 | 0.88 | 0.12 | 0 | 1 | 0.15 | 0.2 | 2.5 | 2 | 0.75 | 1.5 | 0 | 2 |
| 18 | 1 | 0 | 0.85 | 0.15 | 0.4 | 0.6 | 0.15 | 0.2 | 2.5 | 2 | 0.75 | 1.5 | 0 | 2 |
| 19 | 1 | 0 | 0.85 | 0.15 | 0.3 | 0.7 | 0.15 | 0.2 | 2.5 | 2 | 0.75 | 1.5 | 0 | 2 |
| 20 | 1 | 0 | 0.85 | 0.15 | 0.2 | 0.8 | 0.15 | 0.2 | 2.5 | 2 | 0.75 | 1.5 | 0 | 2 |
| 21 | 1 | 0 | 0.85 | 0.15 | 0.05 | 0.95 | 0.15 | 0.2 | 2.5 | 2 | 0.75 | 1.5 | 0 | 2 |
| 22 | 1 | 0 | 0.85 | 0.15 | 0 | 1 | 0.15 | 0.2 | 2.5 | 2 | 0.75 | 1.5 | 0 | 2 |

TABLE 2

Ni-MLCC Proto-type SPL characteristics
(Dielectric constant/DF measurement conditions: AC 0.2 V/μm, 1 kHz, room temperature specific resistance: DC 10 V/μm)
1st grain: Grain with Ca content 3.5at % or less, 2nd grain: Grain with Ca content of 3.5 to 13.5 at % (STEM/EDS analysis)

| Sample | First grain area ratio (%) 100-a | Second grain area ratio (%) a | Room temperature dielectric constant | DF (%) | RC (WF) | TCC(%) (−55° C.) | TCC(%) (150° C.) | TCC(%) (200° C.) | High temperature (200° C.) withstand voltage (V/μm)* | Determination of Characteristics |
|---|---|---|---|---|---|---|---|---|---|---|
| 1 | 100.00% | 0.00% | 1880 | 2.35 | 1584 | −12.30% | −21.60% | −62.10% | 60 | X |
| 2 | 0.00% | 100.00% | 1899 | 6.58 | 843 | −13.90% | −17.50% | −58.20% | 60 | X |
| 3 | 42.00% | 58.00% | 1889 | 3.62 | 1655 | −12.70% | −14.90% | −54.60% | 60 | X |
| 4 | 28.70% | 71.30% | 1868 | 4.33 | 1456 | −13.50% | −14.50% | −38.50% | 60 | ○ |
| 5 | 21.50% | 78.50% | 1858 | 5.14 | 1232 | −13.70% | −14.00% | −35.40% | 60 | ○ |
| 6 | 7.30% | 92.70% | 1876 | 6.32 | 1056 | −14.20% | −13.20% | −34.20% | 65 | ○ |
| 7 | 0.00% | 100.00% | 1858 | 7.11 | 773 | −14.50% | −12.40% | −31.70% | 65 | X |

TABLE 2-continued

Ni-MLCC Proto-type SPL characteristics
(Dielectric constant/DF measurement conditions: AC 0.2 V/μm, 1 kHz, room temperature specific resistance: DC 10 V/μm)
1st grain: Grain with Ca content 3.5at % or less, 2nd grain: Grain with Ca content of 3.5 to 13.5 at % (STEM/EDS analysis)

| Sample | First grain area ratio (%) 100-a | Second grain area ratio (%) a | Room temperature dielectric constant | DF (%) | RC (WF) | TCC(%) (−55° C.) | TCC(%) (150° C.) | TCC(%) (200° C.) | High temperature (200° C.) withstand voltage (V/μm)* | Determination of Characteristics |
|---|---|---|---|---|---|---|---|---|---|---|
| 8  | 37.90% | 62.10%  | 1862 | 3.89 | 1689 | −11.80% | −14.80% | −56.80% | 60 | X |
| 9  | 30.70% | 69.30%  | 1856 | 4.12 | 1512 | −12.90% | −14.50% | −46.10% | 60 | ○ |
| 10 | 16.50% | 83.50%  | 1870 | 4.78 | 1168 | −13.10% | −14.20% | −39.20% | 65 | ○ |
| 11 | 4.30%  | 95.70%  | 1873 | 5.68 | 1236 | −14.00% | −12.40% | −35.70% | 65 | ○ |
| 12 | 0.00%  | 100.00% | 1891 | 7.89 | 720  | −14.70% | −10.60% | −32.60% | 60 | X |
| 13 | 40.60% | 59.40%  | 1851 | 4.11 | 623  | −13.70% | −14.00% | −54.30% | 60 | X |
| 14 | 31.80% | 68.20%  | 1865 | 4.65 | 1274 | −12.50% | −13.90% | −46.50% | 60 | ○ |
| 15 | 17.50% | 82.50%  | 1877 | 5.26 | 1220 | −12.10% | −13.70% | −39.60% | 65 | ○ |
| 16 | 5.50%  | 94.50%  | 1876 | 6.33 | 1011 | −13.00% | −13.60% | −36.40% | 65 | ○ |
| 17 | 0.00%  | 100.00% | 1866 | 7.98 | 450  | −12.50% | −11.60% | −31.50% | 65 | X |
| 18 | 0.00%  | 0.00%   | 1771 | 3.48 | 1374 | −10.80% | −13.50% | −51.20% | 60 | X |
| 19 | 0.00%  | 0.00%   | 1780 | 7.66 | 884  | −11.10% | −13.50% | −44.70% | 65 | X |
| 20 | 0.00%  | 0.00%   | 1873 | 7.85 | 684  | −12.40% | −12.70% | −38.20% | 65 | X |
| 21 | 0.00%  | 0.00%   | 1826 | 8.22 | 568  | −13.50% | −12.50% | −35.80% | 60 | X |
| 22 | 0.00%  | 0.00%   | 1687 | 9.45 | 369  | −12.80% | −11.60% | −32.00% | 60 | X |

In the case of Samples 1 to 22 of Table 1, samples according to a first base material powder $(Ba_{1-x}Ca_x)TiO_3$ (Ca content x=0) and changes in a Ca content (y) of a second base material powder $(Ba_{1-y}Ca_y)TiO_3$ and a ratio (z) of the second base material powder are prepared, under the condition that, with respect to 100 mol of base material mixed powder $(1-z)(Ba_{1-x}Ca_x)TiO_3+z(Ba_{1-y}Ca_y)TiO_3$ 100 mol, the sum of first subcomponent variable-valence elements (Mn and V) is 0.55 mol, the content of a second subcomponent Mg is 2.5 mol, the sum of contents of third subcomponent rare earth elements is 5.5 mol, the sum of fourth subcomponents (Ba and Ca) is 1.5 mol, and the content of a fifth subcomponent Si is 2.0 mol. Samples 1 to 22 of Table 2 illustrate sample characteristics corresponding to these samples.

The first base material powder includes a first base material main component, and the second base material powder includes a second base material main component. A mixing mole ratio of the first base material powder and the second base material powder is used in the same meaning as the mixing mole ratio of the first base material main component and the second base material main component.

In the case in which the Ca content y of the second base material powder is 0.03, both in the ratio z=0 (sample 1) and z=1 (sample 2) of the second base material powder, it can be seen that there is a problem in which high temperature part TCC (150° C.) and high temperature part TCC (200° C.) are outside of X8R and X9M specifications.

Samples 3 to 7 illustrate examples of the change of the ratio z of the second base material powder when the Ca content y of the second base material powder is 0.04. In this case, it can be seen that there is a problem in which, when z=0.6 (Sample 3), the high temperature part TCC (150° C.) and the high temperature part TCC (200° C.) are outside of the X8R and X9M specifications, and when z=1.0 (sample 7), the DF increases to 7.0% or more, and the RC value decreases to less than 1000.

When the ratio z of the second base material powder is in the range of 0.3 to 0.8 (samples 4 to 6), the high temperature part TCC satisfies the X8R and X9M specifications, and a low DF of 7.0% or less, an RC value of 1000 or more and high temperature withstand voltage characteristics of 50 V/μm or higher may be implemented. In this case, it can be seen that the area ratio of the second grain is in the range of 30 to 80% of the total area.

Samples 8 to 12 illustrate examples in which a Ca content y of the second base material powder is 0.075 and the ratio z of the second base material powder is changed. In this case, it can be seen that there is a problem in which when z=0.6 (Sample 8), the high temperature part TCC (200° C.) is outside of the X9M specification and when z=1.0 (sample 12), DF increases to 7.5% or more and the RC value decreases to less than 1000.

When the ratio z of the second base material powder is in the range of 0.7 to 0.95 (samples 9 to 11), the high temperature part TCC simultaneously satisfies the X8R and X9M specifications, and a low DF of 7.0% or less, an RC value of 1000 or more and high temperature (200° C.) withstand voltage characteristics of 50 V/μm or higher may be implemented. In this case, it can be seen that the area ratio of the second grain is in the range of 70 to 95% of the total area.

Samples 13 to 17 illustrate examples in which a Ca content y of the second base material powder is 0.12 and the ratio z of the second base material powder is changed. In this case, it can be seen that there is a problem in which when z=0.6 (Sample 13), the high temperature part TCC (200° C.) is outside of the X9M specification and when z=1.0 (sample 17), DF increases to 7.5% or more and the RC value decreases to less than 1000.

When the ratio z of the second base material powder ranges from 0.7 to 0.95 (samples 14 to 16), the high temperature part TCC simultaneously meets the X8R and X9M specifications, and a low DF of 7.0% or less, an RC value of 1000 or more and high temperature (200° C.) withstand voltage characteristics of 50 V/μm or higher may be implemented. In this case, it can be seen that the area ratio of the second grain is in the range of 70 to 95% of the total area.

Samples 18 to 22 illustrate examples of the change of the ratio z of the second base material powder when the Ca content y of the second base material powder is 0.15. In this case, there is a problem in which, when z=0.6 (Sample 18), the high temperature part TCC (200° C.) is outside of the X9M specification, and when z=0.7, 0.8, 0.95 and 1.0 (samples 19 to 22), the DF increases to 7.5% or more, and the RC value decreases to less than 1000. Therefore, when the Ca content y of the second base material powder is 0.15, it is not possible for the high temperature part TCC to meet X8R and X9M specifications and simultaneously implement low DF of 7.0% or less, RC value of 1000 or more and high temperature (200° C.) withstand voltage characteristics of 50V/μm or more. In these embodiments, there is no area ratio of the second grain.

From the results of the samples 1 to 22 as described above, the microstructure capable of implementing the target characteristics of the present disclosure corresponds to a microstructure in which a is in the range of 70 to 95%, when the area ratio of the first grain is 100-a and the area ratio of the second grain is a. It can be confirmed in this microstructure that, when the Ca content x of the first base material powder $(Ba_{1-x}Ca_x)TiO_3$ is 0 (x=0), the ranges of a Ca content y of the second base material powder $(Ba_{1-y}Ca_y)TiO_3$ and a ratio z of the second base material powder satisfy $0.04 \leq y \leq 0.12$ and $0.7 \leq z \leq 0.95$, respectively.

TABLE 3

| | First main component powder $(Ba_{1-x}Ca_x)TiO_3$ | | Second main component powder $(Ba_{1-y}Ca_y)TiO_3$ | | 1st powder:2nd powder mixing mol ratio $(1 - z)[(Ba_{1-x}Ca_x)TiO_3] + z[(Ba_{1-y}Ca_y)TiO_3]$ | | Number of each additive mole per 100 mole of base material main component | | | | | | |
|---|---|---|---|---|---|---|---|---|---|---|---|---|---|
| | | | | | | | First subcomponent | Second subcomponent | Third subcomponent | | Fourth subcomponent | | Fifth subcomponent |
| Sample | Ba Content 1 − x | Ca Content x | Ba Content 1 − y | Ca Content y | First base material main component 1 − z | Second base material main component z | $MnO_2$ | $V_2O_5$ | $MgCO_3$ | $Y_2O_3$ | $Dy_2O_3$ | $BaCO_3$ | $CaCO_3$ | $SiO_2$ |
| 23 | 0.980 | 0.020 | 0.970 | 0.030 | 0.500 | 0.500 | 0.15 | 0.20 | 2.50 | 2.00 | 0.75 | 1.50 | 0.00 | 2.00 |
| 24 | 0.980 | 0.020 | 0.970 | 0.030 | 0.000 | 1.000 | 0.15 | 0.20 | 2.50 | 2.00 | 0.75 | 1.50 | 0.00 | 2.00 |
| 25 | 0.980 | 0.020 | 0.960 | 0.040 | 0.400 | 0.600 | 0.15 | 0.20 | 2.50 | 2.00 | 0.75 | 1.50 | 0.00 | 2.00 |
| 26 | 0.980 | 0.020 | 0.960 | 0.040 | 0.300 | 0.700 | 0.15 | 0.20 | 2.50 | 2.00 | 0.75 | 1.50 | 0.00 | 2.00 |
| 27 | 0.980 | 0.020 | 0.960 | 0.040 | 0.200 | 0.800 | 0.15 | 0.20 | 2.50 | 2.00 | 0.75 | 1.50 | 0.00 | 2.00 |
| 28 | 0.980 | 0.020 | 0.960 | 0.040 | 0.050 | 0.950 | 0.15 | 0.20 | 2.50 | 2.00 | 0.75 | 1.50 | 0.00 | 2.00 |
| 29 | 0.980 | 0.020 | 0.960 | 0.040 | 0.000 | 1.000 | 0.15 | 0.20 | 2.50 | 2.00 | 0.75 | 1.50 | 0.00 | 2.00 |
| 30 | 0.980 | 0.020 | 0.925 | 0.075 | 0.400 | 0.600 | 0.15 | 0.20 | 2.50 | 2.00 | 0.75 | 1.50 | 0.00 | 2.00 |
| 31 | 0.980 | 0.020 | 0.925 | 0.075 | 0.300 | 0.700 | 0.15 | 0.20 | 2.50 | 2.00 | 0.75 | 1.50 | 0.00 | 2.00 |
| 32 | 0.980 | 0.020 | 0.925 | 0.075 | 0.200 | 0.800 | 0.15 | 0.20 | 2.50 | 2.00 | 0.75 | 1.50 | 0.00 | 2.00 |
| 33 | 0.980 | 0.020 | 0.925 | 0.075 | 0.050 | 0.950 | 0.15 | 0.20 | 2.50 | 2.00 | 0.75 | 1.50 | 0.00 | 2.00 |
| 34 | 0.980 | 0.020 | 0.925 | 0.075 | 0.000 | 1.000 | 0.15 | 0.20 | 2.50 | 2.00 | 0.75 | 1.50 | 0.00 | 2.00 |
| 35 | 0.980 | 0.020 | 0.880 | 0.120 | 0.400 | 0.600 | 0.15 | 0.20 | 2.50 | 2.00 | 0.75 | 1.50 | 0.00 | 2.00 |
| 36 | 0.980 | 0.020 | 0.880 | 0.120 | 0.300 | 0.700 | 0.15 | 0.20 | 2.50 | 2.00 | 0.75 | 1.50 | 0.00 | 2.00 |
| 37 | 0.980 | 0.020 | 0.880 | 0.120 | 0.200 | 0.800 | 0.15 | 0.20 | 2.50 | 2.00 | 0.75 | 1.50 | 0.00 | 2.00 |
| 38 | 0.980 | 0.020 | 0.880 | 0.120 | 0.050 | 0.950 | 0.15 | 0.20 | 2.50 | 2.00 | 0.75 | 1.50 | 0.00 | 2.00 |
| 39 | 0.980 | 0.020 | 0.880 | 0.120 | 0.000 | 1.000 | 0.15 | 0.20 | 2.50 | 2.00 | 0.75 | 1.50 | 0.00 | 2.00 |

TABLE 4

Ni-MLCC Proto-type SPL characteristics
(Dielectric constant/DF measurement conditions: AC 0.2 V/μm, 1 kHz, room temperature specific resistance: DC 10 V/μm)
1st grain: Grain with Ca content 3.5at % or less, 2nd grain: Grain with Ca content of 3.5 to 13.5 at % (STEM/EDS analysis)

| Sample | First grain area ratio (%) 100-a | Second grain area ratio (%) a | Room temperature dielectric constant | DF (%) | RC (WF) | TCC(%) (−55° C.) | TCC(%) (150° C.) | TCC(%) (200° C.) | High temperature (200° C.) withstand voltage (V/μm)* | Determination of Characteristics |
|---|---|---|---|---|---|---|---|---|---|---|
| 23 | 48.0% | 52.0% | 1805 | 4.43 | 1633 | −13.5% | −20.6% | −64.1% | 60 | X |
| 24 | 22.0% | 78.0% | 1827 | 7.62 | 758 | −14.2% | −15.0% | −52.3% | 60 | X |
| 25 | 40.6% | 59.4% | 1874 | 4.21 | 1623 | −11.5% | −14.8% | −58.4% | 60 | X |
| 26 | 31.5% | 68.5% | 1806 | 4.46 | 1256 | −13.7% | −13.8% | −39.2% | 65 | ○ |
| 27 | 20.8% | 79.2% | 1881 | 6.40 | 1132 | −13.7% | −12.5% | −36.0% | 65 | ○ |
| 28 | 3.8% | 96.2% | 1854 | 6.90 | 1002 | −13.8% | −12.8% | −35.6% | 65 | ○ |
| 29 | 0.0% | 100.0% | 1828 | 8.35 | 776 | −14.4% | −12.4% | −33.8% | 60 | X |
| 30 | 37.6% | 62.4% | 1811 | 4.75 | 1463 | −12.5% | −14.9% | −60.3% | 60 | X |
| 31 | 28.7% | 71.3% | 1799 | 5.42 | 1329 | −13.4% | −14.7% | −45.2% | 65 | ○ |
| 32 | 17.6% | 82.4% | 1814 | 6.02 | 1154 | −13.7% | −14.0% | −39.2% | 65 | ○ |
| 33 | 5.8% | 94.2% | 1770 | 6.75 | 1089 | −13.9% | −13.1% | −35.7% | 65 | ○ |
| 34 | 0.0% | 100.0% | 1789 | 8.43 | 645 | −14.8% | −11.1% | −31.5% | 60 | X |
| 35 | 37.5% | 62.5% | 1747 | 5.13 | 1520 | −11.3% | −13.5% | −54.2% | 60 | X |
| 36 | 29.7% | 70.3% | 1734 | 5.55 | 1297 | −12.6% | −14.2% | −43.5% | 65 | ○ |
| 37 | 18.5% | 81.5% | 1716 | 6.84 | 2286 | −13.2% | −13.5% | −36.7% | 60 | ○ |
| 38 | 4.2% | 95.8% | 1730 | 6.99 | 1011 | −13.8% | −12.7% | −35.2% | 60 | ○ |
| 39 | 0.0% | 100.0% | 1750 | 9.22 | 426 | −13.9% | −11.6% | −30.4% | 60 | X |

In the case of Samples 23 to 39 of Table 3, samples according to a first base material powder $(Ba_{1-x}Ca_x)TiO_3$ (Ca content x=0.02) and changes in a Ca content (y) of a second base material powder $(Ba_{1-y}Ca_y)TiO_3$ and a ratio (z) of the second base material powder are prepared, under the condition that, with respect to 100 mol of base material mixed powder (1-z) $(Ba_{1-x}Ca_x)TiO_3+z(Ba_{1-y}Ca_y)TiO_3$, the sum of first subcomponent variable-valence elements (Mn and V) is 0.55 mol, the content of a second subcomponent Mg is 2.5 mol, the sum of contents of third subcomponent rare earth elements is 5.5 mol, the sum of fourth subcomponents (Ba and Ca) is 1.5 mol, and the content of a fifth subcomponent Si is 2.0 mol. Samples 23 to 39 of Table 4 illustrate sample characteristics corresponding to these samples.

When the Ca content y of the second base material powder is 0.03, and when the ratio z of the second base material powder is 0.5 (z=0.5) (sample 23), the high temperature part TCC deviates from the X8R and X9M specifications, and when z=1.0 (sample 24), the TCC X8R specification is satisfied, but the X9M specification is not satisfied, and the DF increases to 7.0% or more and the RC value decreases to less than 1000.

Samples 25 to 29 illustrate examples of a change in the ratio z of the second base material powder when a Ca content y of the second base material powder is 0.04. In the case of z=0.6 (sample 25), the high temperature part TCC satisfies the X8R specification but does not meet the X9M specification. In the case of z=1.0 (sample 29), there is a problem in which the DF increases to 7.5% or more and the RC value decreases to less than 1000.

When the ratio z of the second base material powder is in the range 0.7 to 0.95 (samples 26 to 28), the high temperature part TCC meets the X8R and X9M specifications, and a low DF of 7.0% or less, an RC value of 1000 or more and high temperature (200° C.) withstand voltage characteristics of 50V/μm or more may be implemented simultaneously. In this case, it can be seen that the area ratio of the second grain is in the range of 70 to 95% of the total area.

Samples 30 to 34 illustrate examples of a change in the ratio z of the second base material powder when a Ca content y of the second base material powder is 0.075. In this case, it can be seen that there is a problem in which, when z=0.6 (sample 30), the high temperature part TCC is outside of the X9M specification, and when z=1.0 (sample 34), the DF increases to 7.0% or more and the RC value decreases to less than 1000.

When the ratio z of the second base material powder is in the range of 0.7 to 0.95 (samples 31 to 33), the high temperature part TCC satisfies the X8R and X9M specifications, and a low DF of 7.0% or less, an RC value of 1000 or more and high temperature (200° C.) withstand voltage characteristics of 50 V/μm or higher may be implemented at the same time. In this case, it can be seen that the area ratio of the second grain is in the range of 70 to 95% of the total area.

Samples 35 to 39 illustrate examples of a change in the ratio z of the second base material powder when a Ca content y of the second base material powder is 0.12. In this case, there is a problem in which, when z=0.6 (sample 35), the high temperature part TCC is outside of the X9M specification and when z=1.0 (sample 39), the DF increases to 7.0% or more and the RC value decreases to less than 1000.

When the ratio z of the second base material powder is in the range of 0.7 to 0.95 (samples 36 to 38), the high temperature part TCC satisfies the X8R and X9M specifications, and a low DF of 7.0% or less, an RC value of 1000 or more and high temperature (200° C.) withstand voltage characteristics of 50V/μm or more may be implemented at the same time. In this case, it can be seen that the area ratio of the second grain is in the range of 70 to 95% of the total area.

From the results of the above samples 23 to 39, the microstructure capable of implementing the target characteristics of the present disclosure corresponds to a microstructure in which a is in the range of 70 to 95%, when the area ratio of the first grain is 100-a and the area ratio of the second grain is a. It can be seen in this microstructure that, when the Ca content x of the first base material powder $(Ba_{1-x}Ca_x)TiO_3$ is 0.02 (x=0.02), the ranges of a Ca content y of the second base material powder $(Ba_{1-y}Ca_y)TiO_3$ and a ratio z of the second base material powder satisfy 0.04≤y≤0.12 and 0.7≤z≤0.95, respectively.

TABLE 5

| | First main component powder $(Ba_{1-x}Ca_x)TiO_3$ | | Second main component powder $(Ba_{1-y}Ca_y)TiO_3$ | | 1st powder:2nd powder mixing mol ratio $(1-z)[(Ba_{1-x}Ca_x)TiO_3] + z[(Ba_{1-y}Ca_y)TiO_3]$ | | Number of each additive mole per 100 mole of base material main component | |
|---|---|---|---|---|---|---|---|---|
| | Ba Content | Ca Content | Ba Content | Ca Content | First base material main component | Second base material main component | First sub-component | |
| Sample | 1 − x | x | 1 − y | y | 1 − z | z | $MnO_2$ | $V_2O_5$ |
| 40 | 1.000 | 0.000 | 0.925 | 0.075 | 0.100 | 0.900 | 0.150 | 0.200 |
| 41 | 1.000 | 0.000 | 0.925 | 0.075 | 0.100 | 0.900 | 0.150 | 0.200 |
| 42 | 1.000 | 0.000 | 0.925 | 0.075 | 0.100 | 0.900 | 0.150 | 0.200 |
| 43 | 1.000 | 0.000 | 0.925 | 0.075 | 0.100 | 0.900 | 0.150 | 0.200 |
| 44 | 1.000 | 0.000 | 0.925 | 0.075 | 0.100 | 0.900 | 0.150 | 0.200 |
| 45 | 1.000 | 0.000 | 0.925 | 0.075 | 0.100 | 0.900 | 0.150 | 0.200 |
| 46 | 1.000 | 0.000 | 0.925 | 0.075 | 0.100 | 0.900 | 0.150 | 0.200 |
| 47 | 1.000 | 0.000 | 0.925 | 0.075 | 0.100 | 0.900 | 0.150 | 0.200 |
| 48 | 1.000 | 0.000 | 0.925 | 0.075 | 0.100 | 0.900 | 0.150 | 0.200 |
| 49 | 1.000 | 0.000 | 0.925 | 0.075 | 0.100 | 0.900 | 0.150 | 0.200 |
| 50 | 1.000 | 0.000 | 0.925 | 0.075 | 0.100 | 0.900 | 0.150 | 0.200 |

TABLE 5-continued

| | | | | | | | | |
|---|---|---|---|---|---|---|---|---|
| 51 | 1.000 | 0.000 | 0.925 | 0.075 | 0.100 | 0.900 | 0.150 | 0.200 |
| 52 | 1.000 | 0.000 | 0.925 | 0.075 | 0.100 | 0.900 | 0.150 | 0.200 |
| 53 | 1.000 | 0.000 | 0.925 | 0.075 | 0.100 | 0.900 | 0.150 | 0.200 |
| 54 | 1.000 | 0.000 | 0.925 | 0.075 | 0.100 | 0.900 | 0.150 | 0.200 |
| 55 | 1.000 | 0.000 | 0.925 | 0.075 | 0.100 | 0.900 | 0.000 | 0.000 |
| 56 | 1.000 | 0.000 | 0.925 | 0.075 | 0.100 | 0.900 | 0.200 | 0.000 |
| 57 | 1.000 | 0.000 | 0.925 | 0.075 | 0.100 | 0.900 | 0.300 | 0.000 |
| 58 | 1.000 | 0.000 | 0.925 | 0.075 | 0.100 | 0.900 | 0.600 | 0.000 |
| 59 | 1.000 | 0.000 | 0.925 | 0.075 | 0.100 | 0.900 | 1.000 | 0.000 |
| 60 | 1.000 | 0.000 | 0.925 | 0.075 | 0.100 | 0.900 | 2.000 | 0.000 |
| 61 | 1.000 | 0.000 | 0.925 | 0.075 | 0.100 | 0.900 | 2.500 | 0.000 |
| 62 | 1.000 | 0.000 | 0.925 | 0.075 | 0.100 | 0.900 | 0.300 | 0.050 |
| 63 | 1.000 | 0.000 | 0.925 | 0.075 | 0.100 | 0.900 | 0.200 | 0.100 |
| 64 | 1.000 | 0.000 | 0.925 | 0.075 | 0.100 | 0.900 | 0.000 | 0.200 |

| | Number of each additive mole per 100 mole of base material main component | | | | | |
|---|---|---|---|---|---|---|
| | Second sub-component | Third sub-component | | Fourth sub-component | | Fifth sub-component |
| Sample | $MgCO_3$ | $Y_2O_3$ | $Dy_2O_3$ | $BaCO_3$ | $CaCO_3$ | $SiO_2$ |
| 40 | 1.50 | 0.30 | | 1.500 | 0.000 | 2.00 |
| 41 | 1.50 | 0.50 | | 1.500 | 0.000 | 2.00 |
| 42 | 1.50 | 1.00 | | 1.500 | 0.000 | 2.00 |
| 43 | 1.50 | 2.00 | | 1.500 | 0.000 | 2.00 |
| 44 | 1.50 | 2.50 | | 1.500 | 0.000 | 2.00 |
| 45 | 1.50 | 1.25 | 1.25 | 1.500 | 0.000 | 2.00 |
| 46 | 1.50 | 3.00 | | 1.500 | 0.000 | 2.00 |
| 47 | 1.50 | 3.50 | | 1.500 | 0.000 | 2.00 |
| 48 | 1.50 | 4.00 | | 1.500 | 0.000 | 2.00 |
| 49 | 0.30 | 2.75 | | 1.500 | 0.000 | 2.00 |
| 50 | 0.50 | 2.75 | | 1.500 | 0.000 | 2.00 |
| 51 | 1.00 | 2.75 | | 1.500 | 0.000 | 2.00 |
| 52 | 2.00 | 2.75 | | 1.500 | 0.000 | 2.00 |
| 53 | 3.00 | 2.75 | | 1.500 | 0.000 | 2.00 |
| 54 | 3.50 | 2.75 | | 1.500 | 0.000 | 2.00 |
| 55 | 1.50 | 2.50 | | 1.500 | 0.000 | 2.00 |
| 56 | 1.50 | 2.50 | | 1.500 | 0.000 | 2.00 |
| 57 | 1.50 | 2.50 | | 1.500 | 0.000 | 2.00 |
| 58 | 1.50 | 2.50 | | 1.500 | 0.000 | 2.00 |
| 59 | 1.50 | 2.50 | | 1.500 | 0.000 | 2.00 |
| 60 | 1.50 | 2.50 | | 1.500 | 0.000 | 2.00 |
| 61 | 1.50 | 2.50 | | 1.500 | 0.000 | 2.00 |
| 62 | 1.50 | 2.50 | | 1.500 | 0.000 | 2.00 |
| 63 | 1.50 | 2.50 | | 1.500 | 0.000 | 2.00 |
| 64 | 1.50 | 2.50 | | 1.500 | 0.000 | 2.00 |

TABLE 6

Ni-MLCC Proto-type SPL characteristics
(Dielectric constant/DF measurement conditions: AC 0.2 V/μm, 1 kHz, room temperature specific resistance: DC 10 V/μm)
1st grain: Grain with Ca content 3.5at % or less, 2nd grain: Grain with Ca content of 3.5 to 13.5 at % (STEM/EDS analysis)

| Sample | First grain area ratio (%) 100-a | Second grain area ratio (%) a | Room temperature dielectric constant | DF (%) | RC (WF) | TCC(%) (−55° C.) | TCC(%) (150° C.) | TCC(%) (200° C.) | High temperature (200° C.) withstand voltage (V/μm)* | Determination of Characteristics |
|---|---|---|---|---|---|---|---|---|---|---|
| 40 | 10.4% | 89.6% | 2206 | 6.56 | 1055 | −10.5% | −14.2% | −56.4% | 40 | X |
| 41 | 9.5% | 90.5% | 2014 | 6.25 | 1142 | −8.8% | −14.2% | −52.1% | 50 | X |
| 42 | 9.7% | 90.3% | 1956 | 6.22 | 1223 | −7.7% | −13.8% | −45.2% | 55 | ○ |
| 43 | 10.8% | 89.2% | 1914 | 6.14 | 1345 | −8.4% | −13.2% | −38.5% | 55 | ○ |
| 44 | 11.4% | 88.6% | 1883 | 6.23 | 1427 | −8.9% | −13.0% | −35.5% | 60 | ○ |
| 45 | 11.8% | 88.2% | 1828 | 5.98 | 1526 | −9.4% | −12.5% | −36.4% | 65 | ○ |
| 46 | 8.8% | 91.2% | 1827 | 5.95 | 1632 | −9.2% | −13.6% | −33.5% | 60 | ○ |
| 47 | 10.4% | 89.6% | 1805 | 5.76 | 1774 | −7.7% | −14.5% | −31.7% | 55 | Δ |
| 48 | 9.5% | 90.5% | 1717 | 5.35 | 1702 | −7.5% | −13.3% | −30.5% | 35 | X |
| 49 | 12.1% | 87.9% | 1894 | 5.31 | 482 | −7.9% | −13.0% | −40.4% | 60 | X |

TABLE 6-continued

Ni-MLCC Proto-type SPL characteristics
(Dielectric constant/DF measurement conditions: AC 0.2 V/μm, 1 kHz, room temperature specific resistance: DC 10 V/μm)
1st grain: Grain with Ca content 3.5at % or less, 2nd grain: Grain with Ca content of 3.5 to 13.5 at % (STEM/EDS analysis)

| Sample | First grain area ratio (%) 100-a | Second grain area ratio (%) a | Room temperature dielectric constant | DF (%) | RC (WF) | TCC(%) (−55° C.) | TCC(%) (150° C.) | TCC(%) (200° C.) | High temperature (200° C.) withstand voltage (V/μm)* | Determination of Characteristics |
|---|---|---|---|---|---|---|---|---|---|---|
| 50 | 10.3% | 89.7% | 1886 | 5.24 | 1355 | −7.4% | −13.4% | −36.8% | 60 | ○ |
| 51 | 10.7% | 89.3% | 1740 | 5.22 | 1454 | −7.2% | −13.6% | −35.4% | 60 | ○ |
| 52 | 9.7% | 90.3% | 1646 | 5.16 | 1658 | −6.8% | −14.2% | −34.5% | 60 | ○ |
| 53 | 9.6% | 90.4% | 1539 | 5.18 | 1897 | −6.4% | −15.0% | −32.7% | 60 | Δ |
| 54 | 11.5% | 88.5% | 1419 | 5.11 | 2034 | −5.9% | −14.5% | −36.8% | 40 | X |
| 55 | 10.7% | 89.3% | | | 0.2 | — | — | | 5 | X |
| 56 | 10.6% | 89.4% | 1849 | 7.12 | 1673 | −0.5% | −14.4% | −35.8% | 55 | ○ |
| 57 | 9.5% | 90.5% | 1894 | 6.55 | 1248 | −0.8% | −13.5% | −36.4% | 55 | ○ |
| 58 | 9.7% | 90.3% | 1821 | 5.99 | 1184 | −0.4% | −12.9% | −35.5% | 60 | ○ |
| 59 | 10.5% | 89.5% | 1804 | 5.72 | 1056 | 0.7% | −12.6% | −37.2% | 65 | ○ |
| 60 | 8.7% | 91.3% | 1707 | 5.12 | 1045 | 1.1% | −13.4% | −32.5% | 70 | ○ |
| 61 | 9.9% | 90.1% | 1700 | 4.78 | 785 | 1.2% | −12.9% | −33.3% | 50 | X |
| 62 | 10.6% | 89.4% | 1848 | 5.26 | 1135 | 1.3% | −12.5% | −34.7% | 60 | ○ |
| 63 | 10.2% | 89.8% | 1858 | 6.04 | 1026 | −13.5% | −13.5% | −35.2% | 60 | ○ |
| 64 | 11.3% | 88.7% | 1786 | 5.32 | 1007 | 1.2% | −12.7% | −36.4% | 60 | ○ |

Samples 40 to 64 of Table 5 illustrate respective subcomponent change samples, with respect to a base material powder in which the Ca content x of the first base material powder is 0 (x=0), the Ca content y of the second base material powder is 0.075 (y=0.075), and the ratio z of the second base material powder is 0.9 (z=0.9), in the base material mixed powder (1-z) $(Ba_{1-x}Ca_x)TiO_3+z(Ba_{1-y}Ca_y)TiO_3$. Table 6 illustrates respective sample characteristics.

Samples 40 to 48 of Table 5 illustrate embodiments according to a change in a Y content of the third subcomponent rare earth, under fixed conditions in which in the base material powder (1-z) $(Ba_{1-x}Ca_x)TiO_3+z(Ba_{1-y}Ca_y)TiO_3$ (x=0, y=0.075, z=0.90), in an element ratio to 100 mol of the base material powder, the sum of the first subcomponent variable-valence elements (Mn and V) is 0.55 mol, the Mg content of the second subcomponent is 1.5 mol, the sum of the fourth subcomponents (Ba and Ca) is 1.5 mol, and the Si content of the fifth subcomponent is 2.00 mol, and samples 40 to 48 of Table 6 illustrate characteristics of the samples corresponding to these samples.

When the Y content of the third subcomponent is less than 2.0 mol in the element ratio (samples 40 and 41), the high temperature part TCC does not satisfy the X9M specification and the high temperature (200° C.) withstand voltage characteristics are 50 V/μm or less and degraded, and when the Y content is excessively excessive in an element ratio of 8 mol or more (sample 48), it can be seen that the sintering density is relatively low and the high temperature withstand voltage characteristics deteriorate rapidly. Further, with respect to the content of the same rare earths, it is observed that the properties in the case in which Y is added along (Sample 44) and in the case in which Y and Dy are mixed and added (sample 45) are nearly similar. Therefore, the appropriate content range of the total amount of the third subcomponent rare earths may be 2.0 to 7.0 mol based on 100 mol of the base metal powder in an element ratio.

Samples 49 to 54 of Table 5 illustrate samples according to a change in a Mg content of the second subcomponent, under fixed conditions in which in the base material powder (1-z) $(Ba_{1-x}Ca_x)TiO_3+z(Ba_{1-y}Ca_y)TiO_3$ (x=0, y=0.075, z=0.90), in an element ratio to 100 mol of the base material powder, the sum of the first subcomponent variable-valence elements (Mn and V) is 0.55 mol, the Y content of the third subcomponent is 5.5 mol, the sum of the fourth subcomponents (Ba and Ca) is 1.5 mol, and the Si content of the fifth subcomponent is 2.00 mol, and samples 49 to 54 of Table 6 illustrate sample characteristics corresponding to these samples. When the content of Mg is relatively low, 0.3 mol in an element ratio, there is a problem in which the RC value is a low value of less than 1000, and when the Mg content is an excess of 3.5 mol, the high temperature (200° C.) withstand voltage characteristics are lowered to 50 V/μm or less. Therefore, the appropriate content of the second subcomponent Mg may be 0.5 to 3.0 mol based on 100 mol of the base metal powder in an element ratio.

Embodiments 55 to 61 of Table 5 illustrate the characteristic changes according to the change in the content of the first subcomponent Mn. When the content of Mn is 0 mol (Sample 55), reduction resistance characteristics are not implemented and the RC value is significantly low or the high temperature withstand voltage is low. As the Mn content increases, the high temperature (200° C.) withstand voltage characteristics tend to be improved, and when the Mn content is excessively increased to 2.5 mol (sample 61), there is a problem in which the RC value decreases to less than 1000. Samples 62 to 64 illustrate the change in characteristics depending on the ratio of Mn and V when the sum of the first subcomponents Mn and V is 0.4 mol in the element ratio. As a portion or the entirety of Mn is changed to V, the characteristics are observed to be implemented almost identically. Therefore, the first subcomponent may include at least one or more of Mn, V, and transition metal elements Cr, Fe, Co, Ni, Cu and Zn, which are variable-valence acceptor elements. The appropriate content of the sum of the first subcomponents may be 0.1 to 2.0 mol, or 0.2 to 2.0 mol, based on 100 mol of the base metal powder in an element ratio.

TABLE 7

| | First main component powder $(Ba_{1-x}Ca_x)TiO_3$ | | Second main component powder $(Ba_{1-y}Ca_y)TiO_3$ | | 1st powder:2nd powder mixing mol ratio $(1-z)[(Ba_{1-x}Ca_x)TiO_3] + z[(Ba_{1-y}Ca_y)TiO_3]$ | | Number of each additive mole per 100 mole of base material main component | | | | | | |
|---|---|---|---|---|---|---|---|---|---|---|---|---|---|
| | | | | | First base | Second base | First subcomponent | | Second subcomponent | Third subcomponent | | Fourth subcomponent | | Fifth subcomponent |
| | Ba Content | Ca Content | Ba Content | Ca Content | material main component | material main component | | | | | | | | |
| Sample | 1 − x | x | 1 − y | y | 1 − z | z | $MnO_2$ | $V_2O_5$ | $MgCO_3$ | $Y_2O_3$ | $Dy_2O_3$ | $BaCO_3$ | $CaCO_3$ | $SiO_2$ |
| 65 | 1.000 | 0.000 | 0.925 | 0.075 | 0.100 | 0.900 | 0.150 | 0.200 | 1.50 | 2.25 | | 0.200 | 0.000 | 2.00 |
| 66 | 1.000 | 0.000 | 0.925 | 0.075 | 0.100 | 0.900 | 0.150 | 0.200 | 1.50 | 2.25 | | 0.500 | 0.000 | 2.00 |
| 67 | 1.000 | 0.000 | 0.925 | 0.075 | 0.100 | 0.900 | 0.150 | 0.200 | 1.50 | 2.25 | | 1.000 | 0.000 | 2.00 |
| 68 | 1.000 | 0.000 | 0.925 | 0.075 | 0.100 | 0.900 | 0.150 | 0.200 | 1.50 | 2.25 | | 2.000 | 0.000 | 2.00 |
| 69 | 1.000 | 0.000 | 0.925 | 0.075 | 0.100 | 0.900 | 0.150 | 0.200 | 1.50 | 2.25 | | 3.000 | 0.000 | 2.00 |
| 70 | 1.000 | 0.000 | 0.925 | 0.075 | 0.100 | 0.900 | 0.150 | 0.200 | 1.50 | 2.25 | | 4.000 | 0.000 | 2.00 |
| 71 | 1.000 | 0.000 | 0.925 | 0.075 | 0.100 | 0.900 | 0.150 | 0.200 | 1.50 | 2.25 | | 1.500 | 0.500 | 2.00 |
| 72 | 1.000 | 0.000 | 0.925 | 0.075 | 0.100 | 0.900 | 0.150 | 0.200 | 1.50 | 2.25 | | 1.000 | 1.000 | 2.00 |
| 73 | 1.000 | 0.000 | 0.925 | 0.075 | 0.100 | 0.900 | 0.150 | 0.200 | 1.50 | 2.25 | | 0.500 | 1.500 | 2.00 |
| 74 | 1.000 | 0.000 | 0.925 | 0.075 | 0.100 | 0.900 | 0.150 | 0.200 | 1.50 | 2.25 | | 0.000 | 2.000 | 2.00 |
| 75 | 1.000 | 0.000 | 0.925 | 0.075 | 0.100 | 0.900 | 0.150 | 0.200 | 1.50 | 2.25 | | 1.500 | 0.000 | 0.20 |
| 76 | 1.000 | 0.000 | 0.925 | 0.075 | 0.100 | 0.900 | 0.150 | 0.200 | 1.50 | 2.25 | | 1.500 | 0.000 | 0.50 |
| 77 | 1.000 | 0.000 | 0.925 | 0.075 | 0.100 | 0.900 | 0.150 | 0.200 | 1.50 | 2.25 | | 1.500 | 0.000 | 1.00 |
| 78 | 1.000 | 0.000 | 0.925 | 0.075 | 0.100 | 0.900 | 0.150 | 0.200 | 1.50 | 2.25 | | 1.500 | 0.000 | 1.50 |
| 79 | 1.000 | 0.000 | 0.925 | 0.075 | 0.100 | 0.900 | 0.150 | 0.200 | 1.50 | 2.25 | | 1.500 | 0.000 | 2.50 |
| 80 | 1.000 | 0.000 | 0.925 | 0.075 | 0.100 | 0.900 | 0.150 | 0.200 | 1.50 | 2.25 | | 1.500 | 0.000 | 4.00 |
| 81 | 1.000 | 0.000 | 0.925 | 0.075 | 0.100 | 0.900 | 0.150 | 0.200 | 1.50 | 2.25 | | 1.500 | 0.000 | 5.00 |

TABLE 8

Ni-MLCC Proto-type SPL characteristics
(Dielectric constant/DF measurement conditions: AC 0.2 V/μm, 1 kHz, room temperature specific resistance: DC 10 V/μm)
1st grain: Grain with Ca content 3.5at % or less, 2nd grain: Grain with Ca content of 3.5 to 13.5 at % (STEM/EDS analysis)

| Sample | First grain area ratio (%) 100-a | Second grain area ratio (%) a | Room temperature dielectric constant | DF (%) | RC (WF) | TCC(%) (−55° C.) | TCC(%) (150° C.) | TCC(%) (200° C.) | High temperature (200° C.) withstand voltage (V/μm)* | Determination of Characteristics |
|---|---|---|---|---|---|---|---|---|---|---|
| 65 | 10.5% | 89.5% | 2685 | 8.59 | 1643 | −1.2% | −20.9% | −63.4% | 40 | X |
| 66 | 11.3% | 88.7% | 2126 | 5.68 | 1255 | −8.5% | −14.6% | −40.2% | 50 | ○ |
| 67 | 9.3% | 90.7% | 1790 | 5.36 | 1054 | −8.9% | −13.5% | −38.8% | 55 | ○ |
| 68 | 10.2% | 89.8% | 1869 | 5.34 | 1125 | −8.5% | −13.7% | −37.5% | 60 | ○ |
| 69 | 11.8% | 88.2% | 1862 | 5.25 | 1082 | −9.3% | −12.9% | −35.5% | 60 | ○ |
| 70 | 9.9% | 90.1% | 1678 | 4.64 | 1234 | −9.2% | −12.8% | −31.2% | 40 | X |
| 71 | 10.4% | 89.6% | 1803 | 5.23 | 1238 | −8.9% | −13.0% | −35.5% | 60 | ○ |
| 72 | 9.5% | 90.5% | 1761 | 5.12 | 1134 | −8.8% | −13.5% | −36.4% | 60 | ○ |
| 73 | 9.4% | 90.6% | 1820 | 5.15 | 1254 | −8.9% | −13.9% | −34.2% | 60 | ○ |
| 74 | 11.2% | 88.8% | 1790 | 5.08 | 1321 | −8.1% | −13.7% | −33.8% | 60 | ○ |
| 75 | 10.4% | 89.6% | 2923 | 6.68 | 1212 | −9.6% | −18.5% | −65.8% | 35 | X |
| 76 | 10.8% | 89.2% | 1788 | 4.88 | 1024 | −9.3% | −13.9% | −40.4% | 60 | ○ |
| 77 | 9.2% | 90.8% | 2038 | 4.11 | 1005 | −9.9% | −14.5% | −35.8% | 60 | ○ |
| 78 | 10.8% | 89.2% | 1732 | 4.65 | 1037 | −10.2% | −11.5% | −34.5% | 60 | ○ |
| 79 | 11.5% | 88.5% | 1725 | 4.84 | 1085 | −10.2% | −12.2% | −33.2% | 60 | ○ |
| 80 | 12.2% | 87.8% | 1686 | 5.32 | 1015 | −10.2% | −13.6% | −32.6% | 55 | ○ |
| 81 | 10.3% | 89.7% | 1644 | 5.12 | 893 | −9.5% | −14.0% | −33.3% | 45 | X |

Samples 65 to 74 of Table 7 illustrate samples according to a change in a Ba or Ca content of the fourth subcomponent, under fixed conditions in which in the base material powder $(1-z)(Ba_{1-x}Ca_x)TiO_3+z(Ba_{1-y}Ca_y)TiO_3$ (x=0, y=0.075, z=0.90), in an element ratio to 100 mol of the base material powder, the sum of the first subcomponent variable-valence elements (Mn and V) is 0.55 mol, the Mg content of the second subcomponent is 1.5 mol, the content of the third subcomponent rare earth element is 4.5 mol, and the Si content of the fifth subcomponent is 2.00 mol, and samples 65 to 74 of Table 8 illustrate sample characteristics corresponding to these samples.

When the Ba content is very small (0.2 mol) (Sample 65), the high temperature part TCC does not meet the X8R and X9M specifications, and the high temperature (200° C.) withstand voltage characteristics are 50 V/μm or less and are degraded, and when the Ba content is 4 mol or more in an element ratio in an excessive amount (sample 70), it can be seen that the sintered density is low and the high temperature (200° C.) withstand voltage characteristics deteriorate rapidly. In addition, even when a portion or the entirety of Ba is changed to Ca (samples 71 to 74), it can be confirmed that almost the same characteristics as those in the case in which Ba is added alone are implemented. Therefore, the appropriate content of the fourth subcomponent Ba or Ca may be 0.5 to 3.0 mol based on 100 mol of the base metal powder in an element ratio.

Samples 75 to 81 of Table 7 illustrate embodiments according to a change in a Si content of the fifth subcomponent, under fixed conditions in which in the base material powder $(1-z)$ $(Ba_{1-x}Ca_x)TiO_3+z(Ba_{1-y}Ca_y)TiO_3$ ($x=0$, $y=0.075$, $z=0.90$), in an element ratio to 100 mol of the base material powder, the sum of the first subcomponent variable-valence elements (Mn and V) is 0.55 mol, the Mg content of the second subcomponent is 1.5 mol, the third subcomponent rare earth element content is 4.5 mol, and the Ba or Ca content of the fourth subcomponent is 1.5 mol, and samples 75 to 81 of Table 8 illustrate characteristics of the samples corresponding to these samples.

When the content of Si is very small (0.2 mol) (Sample 75), the high temperature part TCC does not meet the X8R and X9M specifications, and the high temperature (200° C.) withstand voltage characteristics are 50 V/μm or less and are degraded, and when the Si content is 5 mol or more in an element ratio in an excessive amount (sample 81), it can be seen that the RC value is a low value of less than 1000 and the high temperature (200° C.) withstand voltage characteristics deteriorate to less than 50 V/μm. Therefore, the appropriate content of the fifth subcomponent Ba or Ca may be 0.5 to 4.0 mol based on 100 mol of the base metal powder in an element ratio.

As set forth above, according to an embodiment, a dielectric ceramic composition having excellent high temperature withstand voltage characteristics and a multilayer ceramic electronic component having the same may be provided.

According to an embodiment, a dielectric ceramic composition and a multilayer ceramic electronic component, in which a relatively high RC value may be provided while suppressing a decrease in dielectric constant, may be provided.

According to an embodiment, a dielectric ceramic composition and a multilayer ceramic electronic component in which X7R, X8R and X9M may be satisfied, may be provided.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A dielectric ceramic composition comprising:
   a base material main component of barium titanate and a subcomponent,
   wherein the base material main component comprises a first base material main component represented by $(Ba_{1-x}Ca_x)TiO_3$ ($x \le 0.035$) and a second base material main component represented by $(Ba_{1-y}Ca_y)TiO_3$ ($0.035 \le y \le 0.135$), and
   a molar ratio of the first base material main component to the second base material main component is (1-z):z, in which $0.9 \le z \le 0.95$.

2. The dielectric ceramic composition of claim 1, wherein the subcomponent comprises at least one of:
   a first subcomponent comprising at least one selected from the group consisting of a variable-valence acceptor element including at least one of manganese (Mn), vanadium (V), chromium (Cr), iron (Fe), nickel (Ni), cobalt (Co), copper (Cu), and zinc (Zn), oxides thereof, or carbonates thereof;
   a second subcomponent comprising at least one of fixed-valence acceptor elements including Mg, oxides thereof, or carbonates thereof;
   a third subcomponent comprising at least one selected from the group consisting of at least one of yttrium (Y), dysprosium (Dy), holmium (Ho), erbium (Er), gadolinium (Gd), Cerium (Ce), neodymium (Nd), samarium (Sm), terbium (Tb), thulium (Tm), lanthanum (La) and ytterbium (Yb), oxides thereof, or carbonates thereof;
   a fourth subcomponent comprising at least one selected from the group consisting of at least one of barium (Ba) and calcium (Ca), oxides thereof, or carbonates thereof; and
   a fifth subcomponent comprising at least one selected from the group consisting of an oxide of a silicon (Si) element, a carbonate of a Si element, and a glass containing a Si element.

3. The dielectric ceramic composition of claim 2, wherein a sum of contents of variable-valence acceptor elements of one or more of Mn, V, Cr, Fe, Ni, Co, Cu and Zn included in the first subcomponent is 0.1 to 2.0 mole parts based on 100 mole parts of the base material main component,
   the content of the fixed-valence acceptor elements including Mg, included in the second subcomponent, is 0.5 to 3.0 mole parts based on 100 mole parts of the base material main component,
   a sum of contents of one or more of Y, Dy, Ho, Er, Gd, Ce, Nd, Sm, Tb, Tm, La, and Yb included in the third subcomponent is 2.0 to 7 mole parts based on 100 mole parts of the base material main component,
   a sum of contents of one or more of Ba and Ca included in the fourth subcomponent is 0.5 to 3.0 mole parts based on 100 mole parts of the base material main component, and
   a content of the Si element included in the fifth subcomponent is 0.5 to 4.0 mole parts based on 100 mole parts of the base material main component.

4. The dielectric ceramic composition of claim 1, wherein the subcomponent comprises a first subcomponent comprising at least one selected from the group consisting of variable-valence acceptor elements comprising at least one of Mn, V, Cr, Fe, Ni, Co, Cu and Zn, oxides thereof, or carbonates thereof, and
   a sum of contents of variable-valence acceptor elements of one or more of Mn, V, Cr, Fe, Ni, Co, Cu and Zn included in the first subcomponent is 0.1 to 2.0 mole parts based on 100 mole parts of the base material main component.

5. The dielectric ceramic composition of claim 1, wherein the subcomponent comprises a second subcomponent comprising at least one of fixed-valence acceptor elements comprising Mg, oxides thereof, or carbonates thereof, and
the content of the fixed-valence acceptor elements including Mg, included in the second subcomponent, is 0.5 to 3.0 mole parts based on 100 mole parts of the base material main component.

6. The dielectric ceramic composition of claim 1, wherein the subcomponent comprises a third subcomponent comprising at least one selected from the group consisting of at least one of Y, Dy, Ho, Er, Gd, Ce, Nd, Sm, Tb, Tm, La, and Yb, oxides thereof, or carbonates thereof, and
a sum of contents of one or more of Y, Dy, Ho, Er, Gd, Ce, Nd, Sm, Tb, Tm, La, and Yb included in the third subcomponent is 2.0 to 7 mole parts based on 100 mole parts of the base material main component.

7. The dielectric ceramic composition of claim 1, wherein the subcomponent comprises a fourth subcomponent comprising at least one selected from the group consisting of at least one of Ba and Ca, oxides thereof, or carbonates thereof, and
a sum of contents of one or more of Ba and Ca included in the fourth subcomponent is 0.5 to 3.0 mole parts based on 100 mole parts of the base material main component.

8. The dielectric ceramic composition of claim 1, wherein the subcomponent comprises a fifth subcomponent comprising at least one selected from the group consisting of an oxide of a Si element, a carbonate of a Si element, and a glass containing a Si element, and
a content of the Si element included in the fifth subcomponent is 0.5 to 4.0 mole parts based on 100 mole parts of the base material main component.

9. A multilayer ceramic electronic component comprising:
a ceramic body including a dielectric layer and an internal electrode; and
an external electrode disposed on an external surface of the ceramic body and connected to the internal electrode,
wherein the base material main component comprises a first base material main component represented by $(Ba_{1-x}Ca_x)TiO_3$ ($x \leq 0.035$) and a second base material main component represented by $(Ba_{1-y}Ca_y)TiO_3$ ($0.035 \leq y \leq 0.135$), and
a molar ratio of the first base material main component to the second base material main component is (1-z):z, in which $0.9 \leq z \leq 0.95$.

10. The multilayer ceramic electronic component of claim 9, wherein the subcomponent comprises at least one of:
a first subcomponent comprising at least one selected from the group consisting of a variable-valence acceptor element including at least one of manganese (Mn), vanadium (V), chromium (Cr), iron (Fe), nickel (Ni), cobalt (Co), copper (Cu), and zinc (Zn), oxides thereof, or carbonates thereof;
a second subcomponent comprising at least one of fixed-valence acceptor elements including Mg, oxides thereof, or carbonates thereof;
a third subcomponent comprising at least one selected from the group consisting of at least one of yttrium (Y), dysprosium (Dy), holmium (Ho), erbium (Er), gadolinium (Gd), Cerium (Ce), neodymium (Nd), samarium (Sm), terbium (Tb), thulium (Tm), lanthanum (La) and ytterbium (Yb), oxides thereof, or carbonates thereof;
a fourth subcomponent comprising at least one selected from the group consisting of at least one of barium (Ba) and calcium (Ca), oxides thereof, or carbonates thereof; and
a fifth subcomponent comprising at least one selected from the group consisting of an oxide of a silicon (Si) element, a carbonate of a Si element, and a glass containing a Si element.

11. The multilayer ceramic electronic component of claim 10, wherein a sum of contents of variable-valence acceptor elements of one or more of Mn, V, Cr, Fe, Ni, Co, Cu and Zn included in the first subcomponent is 0.1 to 2.0 mole parts based on 100 mole parts of the base material main component,
the content of the fixed-valence acceptor elements including Mg, included in the second subcomponent, is 0.5 to 3.0 mole parts based on 100 mole parts of the base material main component,
a sum of contents of one or more of Y, Dy, Ho, Er, Gd, Ce, Nd, Sm, Tb, Tm, La, and Yb included in the third subcomponent is 2.0 to 7 mole parts based on 100 mole parts of the base material main component,
a sum of contents of one or more of Ba and Ca included in the fourth subcomponent is 0.5 to 3.0 mole parts based on 100 mole parts of the base material main component, and
a content of the Si element included in the fifth subcomponent is 0.5 to 4.0 mole parts based on 100 mole parts of the base material main component.

12. The multilayer ceramic electronic component of claim 9, wherein the subcomponent comprises a first subcomponent comprising at least one selected from the group consisting of variable-valence acceptor elements comprising at least one of Mn, V, Cr, Fe, Ni, Co, Cu and Zn, oxides thereof, or carbonates thereof, and
a sum of contents of variable-valence acceptor elements of one or more of Mn, V, Cr, Fe, Ni, Co, Cu and Zn included in the first subcomponent is 0.1 to 2.0 mole parts based on 100 mole parts of the base material main component.

13. The multilayer ceramic electronic component of claim 9, wherein the subcomponent comprises a second subcomponent comprising at least one of fixed-valence acceptor elements comprising Mg, oxides thereof, or carbonates thereof, and
the content of the fixed-valence acceptor elements including Mg, included in the second subcomponent, is 0.5 to 3.0 mole parts based on 100 mole parts of the base material main component.

14. The multilayer ceramic electronic component of claim 9, wherein the subcomponent comprises a third subcomponent comprising at least one selected from the group consisting of at least one of Y, Dy, Ho, Er, Gd, Ce, Nd, Sm, Tb, Tm, La, Gd and Yb, oxides thereof, or carbonates thereof, and
a sum of contents of one or more of Y, Dy, Ho, Er, Gd, Ce, Nd, Sm, Tb, Tm, La, Gd and Yb included in the third subcomponent is 2.0 to 7 mole parts based on 100 mole parts of the base material main component.

15. The multilayer ceramic electronic component of claim 9, wherein the subcomponent comprises a fourth subcomponent comprising at least one selected from the group consisting of at least one of Ba and Ca, oxides thereof, or carbonates thereof, and a sum of contents of one or more of Ba and Ca included in the fourth subcomponent is 0.5 to 3.0 mole parts based on 100 mole parts of the base material main component.

16. The multilayer ceramic electronic component of claim 9, wherein the subcomponent comprises a fifth subcomponent comprising at least one selected from the group consisting of an oxide of Si element, a carbonate of Si element, and a glass containing an Si element, and a content of the Si element included in the fifth subcomponent is 0.5 to 4.0 mole parts based on 100 mole parts of the base material main component.

* * * * *